Patented May 29, 1923.

1,456,949

UNITED STATES PATENT OFFICE.

ARMAND LOUIS ADRIEN TEILLARD, OF PARIS, FRANCE.

PROCESS OF PURIFYING NATURAL BARIUM SULPHATE.

No Drawing.   Application filed June 30, 1922.   Serial No. 572,033.

*To all whom it may concern:*

Be it known that I, ARMAND LOUIS ADRIEN TEILLARD, a citizen of France, and a resident of Paris, France, have invented certain new and useful Improvements in Processes of Purifying Natural Barium Sulphate; and I do hereby declare the following to be a full, clear, and exact description of the invention, such as will enable others skilled in the art to which it appertains to make and use the same.

My invention relates to a process of purifying natural barium sulphate which consists in a furnace treatment of the ore containing the pure barium sulphate more or less contaminated with oxide of iron and silica, in various forms and in small quantity.

For this purpose the ore is first crushed and sorted according to size (from 0 to 25 millimeters) and is then placed in a suitable furnace. It is observed that the crystals of greatest purity will split up first of all, whilst the silica remains unbroken. After a few minutes, the ore is withdrawn from the furnace on to a grating whose spacing is of such nature that before feeding into the furnace it would allow none of the pieces to fall through, whereas after the furnace treatment, the powder which arises from the pieces which split up in the furnace and which consists of barium sulphate in a very white and pure state only will pass through the grating. The remainder will constitute an inferior quality.

The furnace for the ore treatment can be constituted by a retort of fireproof material which is of the same character as the retorts employed in gas works for the distillation of coal. The net heating surface has three metres length and sixty centimeters width, and the temperature is maintained at about 300° centigrade. Each furnace charge is 250 kilogrammes, and the time of the furnace treatment is 15 minutes. In these conditions, when treating an ore composed of barium sulphate 95%, silica 4% and oxide of iron 0.25%, it is observed that over one-half of each furnace charge, or 125 kilogrammes, will pass through the discharge grating.

Analysis of the products affords the following figures:

For the purified sulphate; barium sulphate 99%; silica 0.5%, oxide of iron 0.1%. For the remainder; barium sulphate 91%, silica 7.5%, oxide of iron 0.4%.

The major part of the purified sulphate consists of a fine powder which passes with facility through sieve No. 200.

It will be observed that the said fine powder can be reduced to an impalpable powder by the same process, but in this case by mechanically projecting said powder upon a suitably heated sole in such manner as to cause the grains to split up infinitely.

The process according to this invention is of an essentially practical and economical nature. It is practical by reason of the fact that it requires no complicated manipulation for the drying of the material which in most cases precedes the pulverizing of a mineral substance. It is economical, in that the temperature at which the grains or crystals will split up is readily attained and differs but little from what would be necessary for the drying alone.

The explanation of the phenomenon is somewhat complex, but it will be readily understood that the pieces of silica having little expansion and containing no water will not become split up. Less knowledge is had concerning the case of fragments of barium sulphate contaminated by oxide of iron which in like manner will become split up, or at least, this action will not only take place at a later period. It may happen that their cohesion, which is diminished by the oxide of iron, is too low to prevail as far as the point of rupture in order to counteract the internal work produced by the heat.

What I claim is:

1. Process for the purification of barium sulphate which comprises grinding the ore, heating the pulverized material to split up the pure crystals and leave the impure crystals, and sifting the material.

2. Process for the purification of barium sulphate consisting in grinding the ore, heating the pulverized material in a furnace heated to a temperature of about 300° C., and sifting the material.

3. Process for the purification of barium sulphate which comprises grinding the ore, heating the pulverized material to split up the pure crystals and leave the impure crystals, and thereafter projecting the purified siftings against a hot surface to convert the barium sulphate into an impalpable powder.

In testimony that I claim the foregoing as my invention, I have signed my name hereto.

ARMAND LOUIS ADRIEN TEILLARD.